UNITED STATES PATENT OFFICE.

GEORGE L. BURNHAM, OF PROVIDENCE, RHODE ISLAND.

PAINT FOR SHIPS' BOTTOMS.

SPECIFICATION forming part of Letters Patent No. 575,800, dated January 26, 1897.

Application filed August 17, 1896. Serial No. 602,928. (No specimens.)

*To all whom it may concern:*

Be it known that I, GEORGE L. BURNHAM, a citizen of the United States, residing at Providence, in the county of Providence and State of Rhode Island, have invented certain new and useful Improvements in Paint for Ships' Bottoms; and I do declare the following to be a full, clear, and exact description of the invention, such as will enable others skilled in the art to which it appertains to make and use the same.

This invention relates to certain new and useful improvements in paints, and especially to a coating for ships' bottoms and other surfaces which are exposed to the action of sea-water and upon which barnacles or other crustacea are likely to collect. Besides, my improved paint being an effectual preventive against barnacles becoming attached to the surface of the bottoms of ships, it will also prevent worms from burrowing in the hull of a wooden ship as well as in any submarine wooden structure.

In my experiments in endeavoring to find a suitable paint for the purpose for which I design my paint I have found that kelp, a sea-weed, ground while green and wet with oil, when compounded with certain other ingredients which form principally a body to retain the kelp, will effectually prevent barnacles from adhering to the bottom of a ship which is subjected to sea-water and also to prevent any kind of marine animal from touching the wood thus coated. My paint when applied to the surface of a ship's bottom will also present a smooth enameled gloss which will not in any way retard the progress of the ship when in motion through the water.

In preparing my paint I take a quantity of linseed-oil, say ten gallons, and add to it one-half pound of litharge and one-half pound of sugar of lead. These ingredients are boiled together for five hours under a heat of 600° Fahrenheit, at which degree the ingredients are thoroughly fused together, after which the mixture is reduced by the application of turpentine to the right consistency of a paint, which may be easily applied with a brush. To this mixture I apply one pint of kelp, which is first ground with oil, the kelp being green and wet at the time of its being ground, after which the paint is ready for use.

Various colors of ocher or other coloring mixtures may be applied to get a suitable color, but none of which have any effect on the kelp or other ingredients.

My improved paint, while being a sure guard against barnacles and all other crustaceans forming on ships' bottoms, also will preserve the hull from the action of the sea-water and prevent any metallic portions with which the paint is coated from corroding.

Having thus described my invention, what I claim to be new, and desire to secure by Letters Patent, is—

A paint for the bottoms of ships, consisting of kelp, which is ground while green and wet, in oil, and compounded with litharge, sugar of lead, turpentine and linseed-oil, in the proportions hereinbefore set forth.

In testimony whereof I affix my signature in presence of two witnesses.

GEO. L. BURNHAM.

Witnesses:
CHARLES E. ANGELL,
DENNIS J. HOLLAND.